Dec. 11, 1956    F. DRUECK, JR    2,773,324
FRAME TYPE DISPLAY DEVICE
Filed Sept. 27, 1952    6 Sheets-Sheet 1
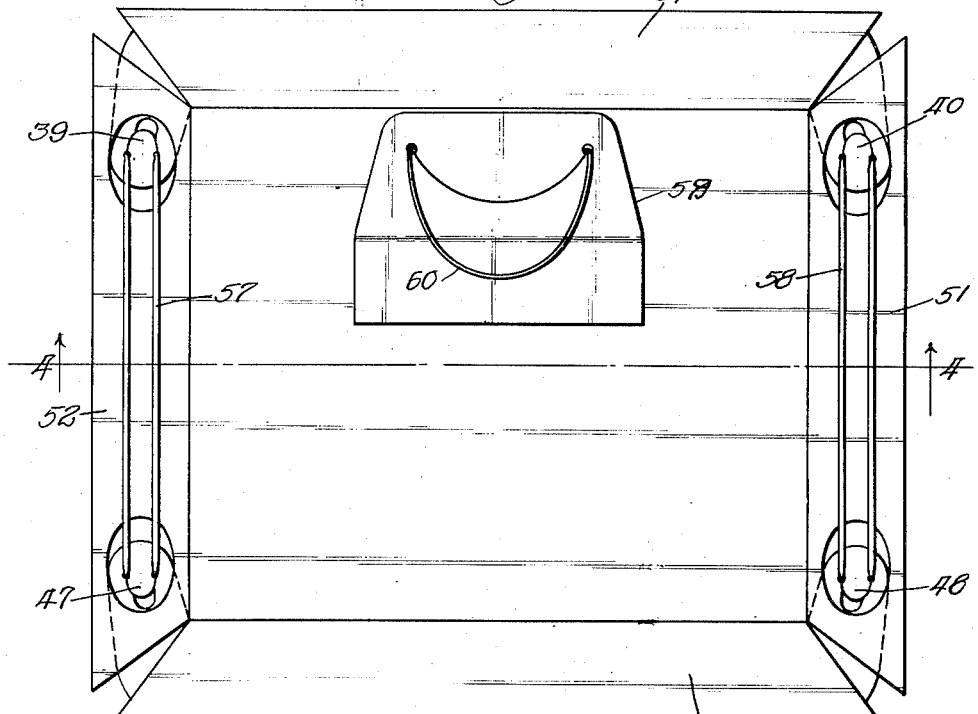
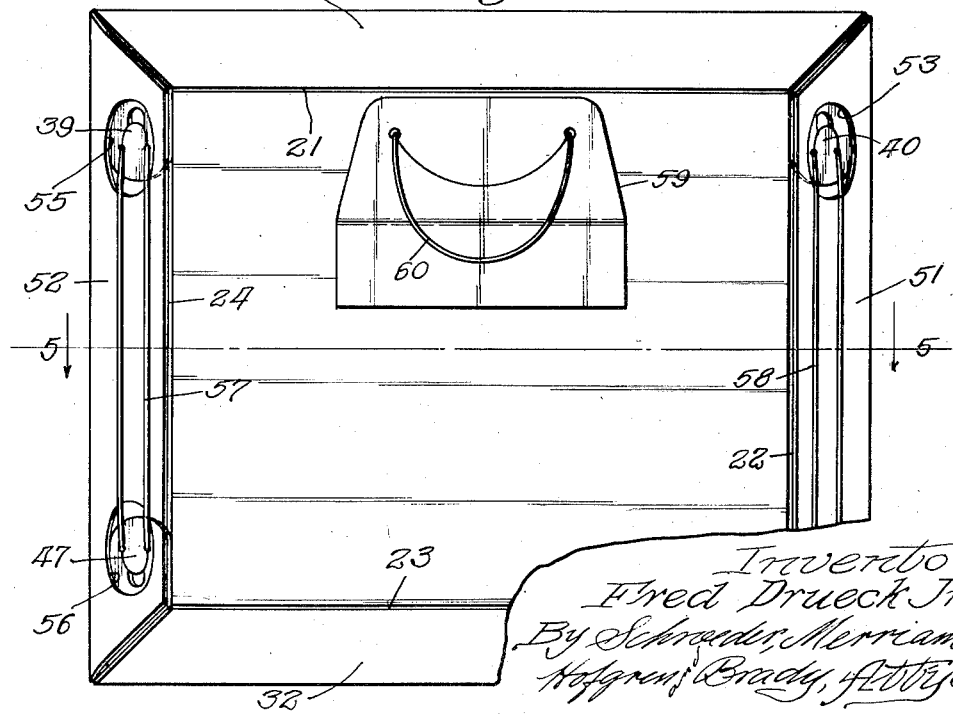
Inventor:
Fred Drueck Jr,
By Schroeder, Merriam,
Hofgren & Brady, Attys.

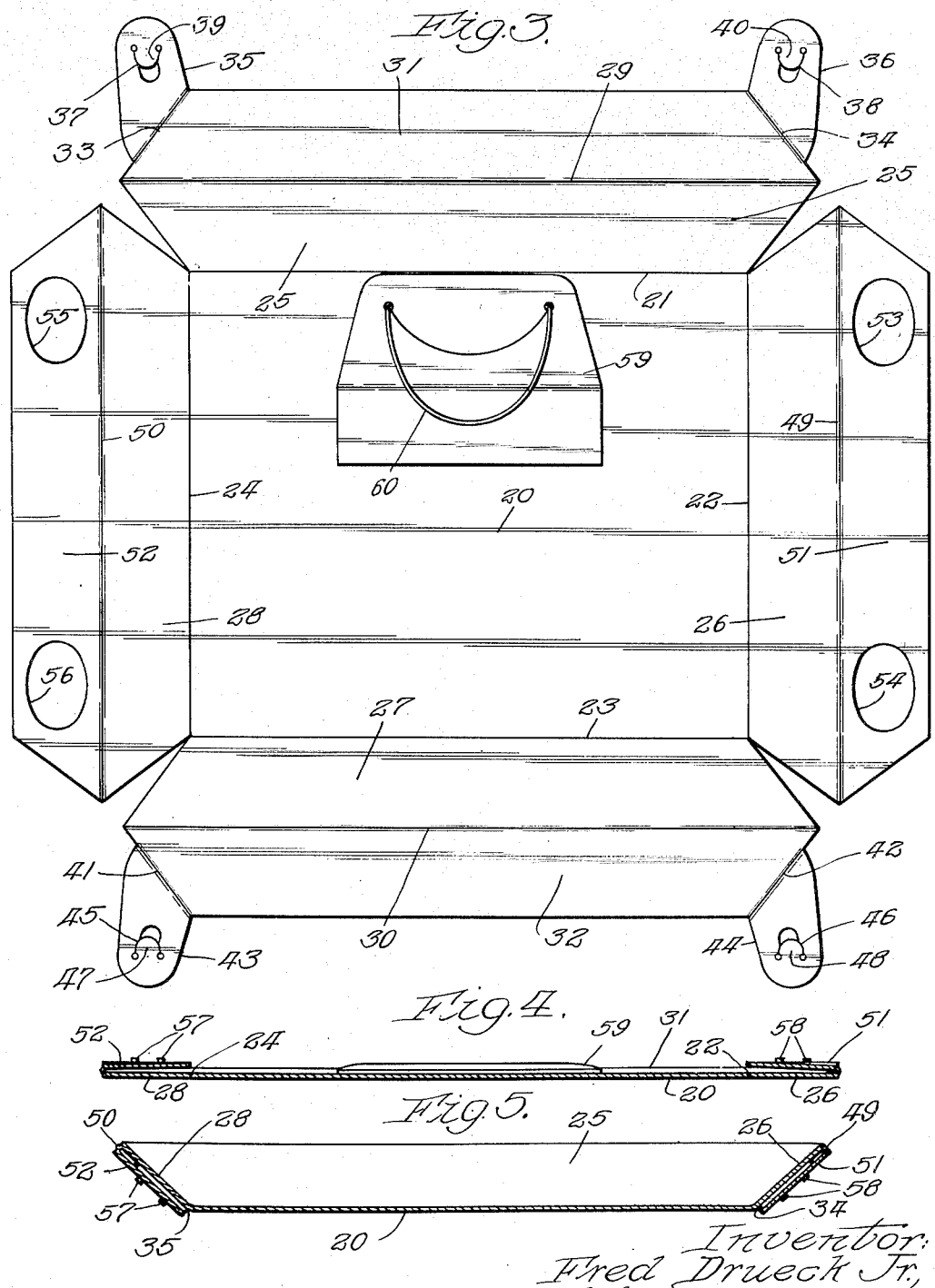

Dec. 11, 1956  F. DRUECK, JR  2,773,324
FRAME TYPE DISPLAY DEVICE
Filed Sept. 27, 1952  6 Sheets-Sheet 3

Inventor:
Fred Drueck Jr.,
By Schroeder, Merriam,
Hofgren & Brady, Att'ys.

Dec. 11, 1956  F. DRUECK, JR  2,773,324
FRAME TYPE DISPLAY DEVICE
Filed Sept. 27, 1952  6 Sheets-Sheet 4
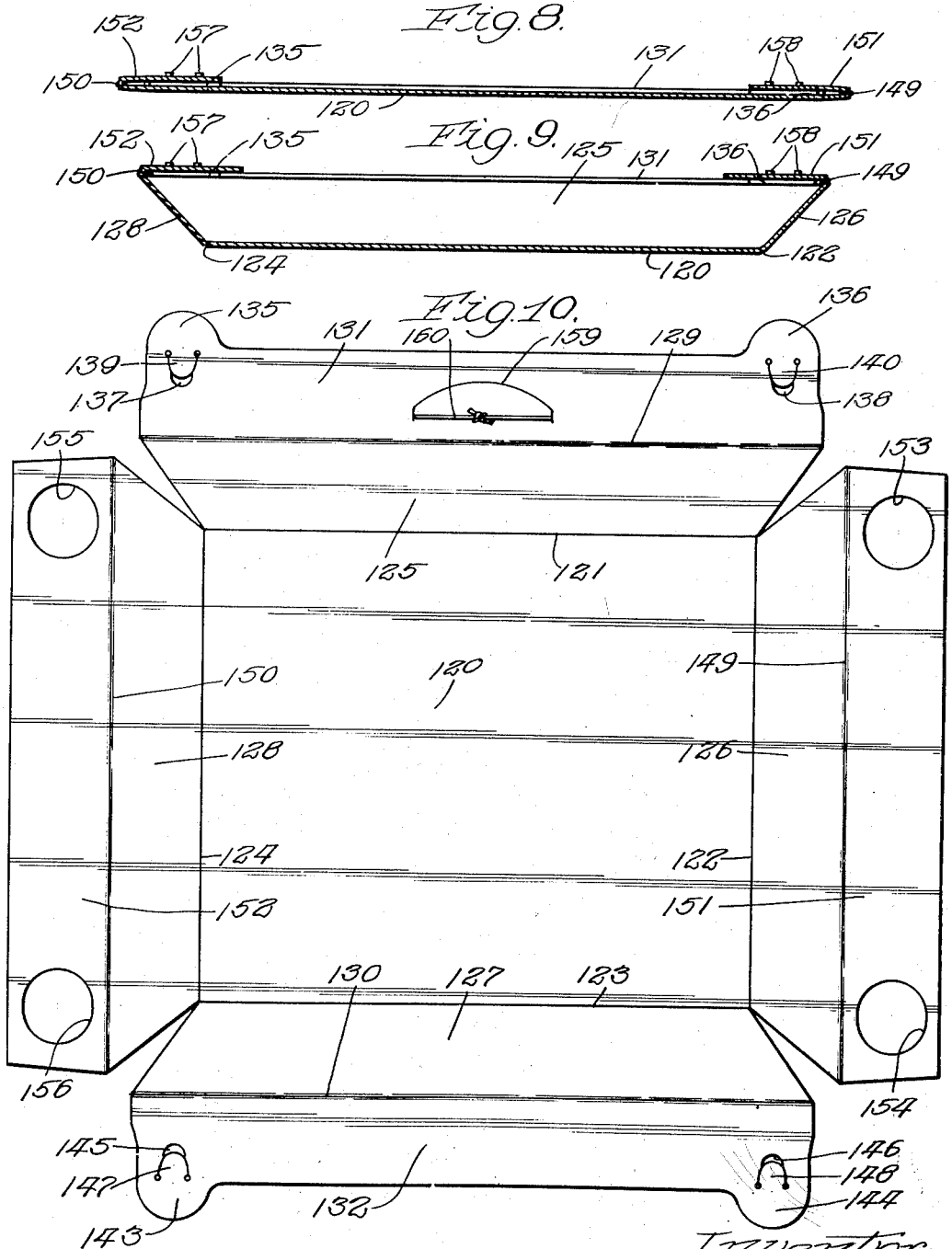

Dec. 11, 1956 F. DRUECK, JR 2,773,324
FRAME TYPE DISPLAY DEVICE
Filed Sept. 27, 1952 6 Sheets-Sheet 5
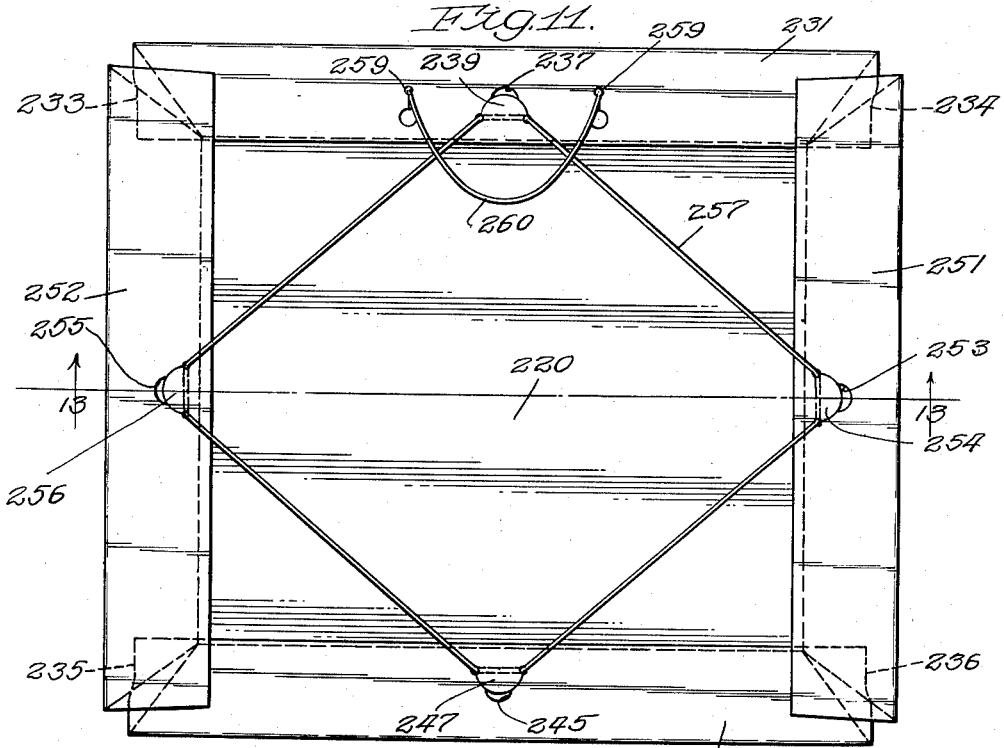
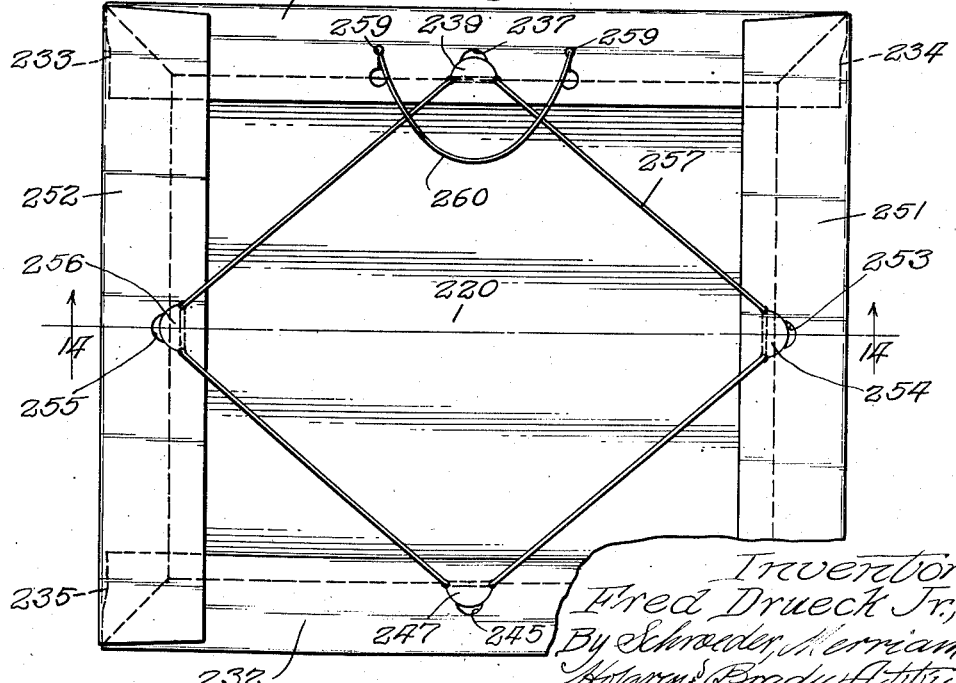
Inventor:
Fred Drueck Jr.,
By Schroeder, Merriam,
Hofgren & Brady, Attys.

Dec. 11, 1956 F. DRUECK, JR 2,773,324
FRAME TYPE DISPLAY DEVICE
Filed Sept. 27, 1952 6 Sheets-Sheet 6
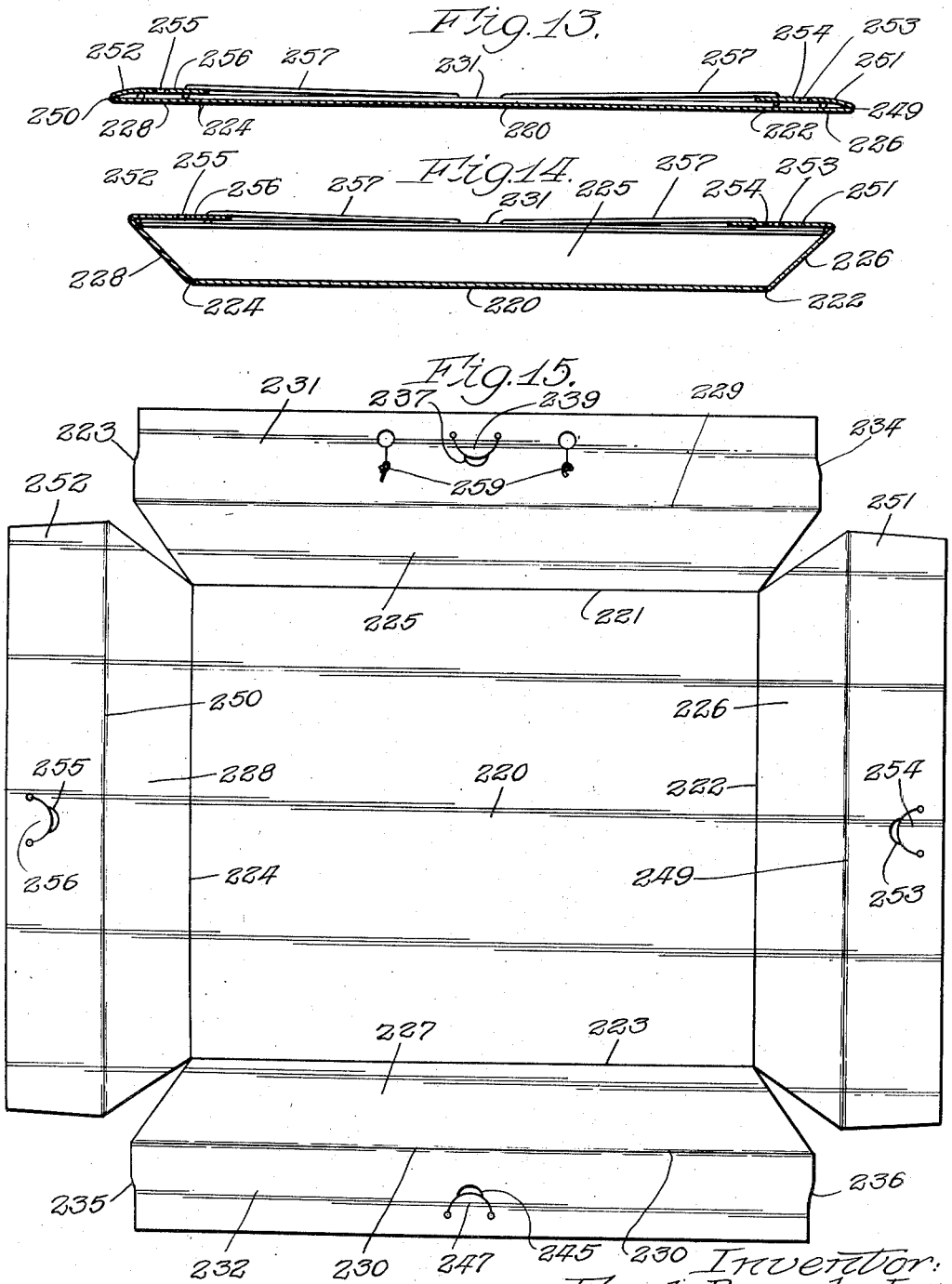

United States Patent Office 2,773,324
Patented Dec. 11, 1956

2,773,324

FRAME TYPE DISPLAY DEVICE

Fred Drueck, Jr., Chicago, Ill., assignor to Chicago Cardboard Company, a corporation of Illinois Application September 27, 1952, Serial No. 311,906

9 Claims. (Cl. 40—155)

This invention relates to a collapsible display device of sheet material, and in particular it relates to a device of the type in which a central display panel is surrounded by an integral frame.

One of the principal purposes of all display devices which must be assembled at the point of use is to make them as simple as possible for the user to assemble. It is also desirable, where possible, to make such devices of a single piece of sheet material, such as paperboard, in ordinary cutting and scoring operations.

The device of the present invention provides a frame type display which, in assembled position, has frame pieces disposed at an angle with respect to the plane of a display panel so as to form a continuous frame around the display panel, and which in collapsed position lies flat with all the elements of the device lying in surface abutting relationship. The device is provided with elastic members which are tensioned between portions of the frame structure so that the elastic members automatically draw the frame portions of the device to their assembled positions. The device may be compressed to its collapsed position, which stretches the elastic members slightly, and may be retained in its collapsed position by being enclosed in a restraining envelope or package so that it may be shipped flat. As soon as the restraint afforded by the shipping package is removed the device automatically assumes its assembled position.

The invention is illustrated in a preferred and in two alternative embodiments in the accompanying drawings in which:

Fig. 1 is a rear elevational view of the preferred form of the device in its collapsed position;

Fig. 2 is a rear elevational view of said preferred form in its assembled position;

Fig. 3 is a plan view of a blank from which the preferred form of the device is formed;

Fig. 4 is a section taken as indicated along the line 4—4 of Fig. 1;

Fig. 5 is a section taken as indicated along the line 5—5 of Fig. 2;

Fig. 8 is a section taken as indicated along the line 8—8 in Fig. 6;

Fig. 9 is a section taken as indicated along the line 9—9 of Fig. 7;

Fig. 10 is a plan view of a blank for forming the device of Fig. 6;

Fig. 11 is a rear elevational view of a further alternative embodiment of the device in its collapsed position;

Fig. 12 is a view similar to Fig. 11 showing the device of Fig. 11 in its assembled position;

Fig. 13 is a section taken as indicated along the line 13—13 of Fig. 11;

Fig. 14 is a section taken as indicated along the line 14—14 of Fig. 12; and

Fig. 15 is a plan view of a blank for forming the device of Fig. 11.

Figure 6:
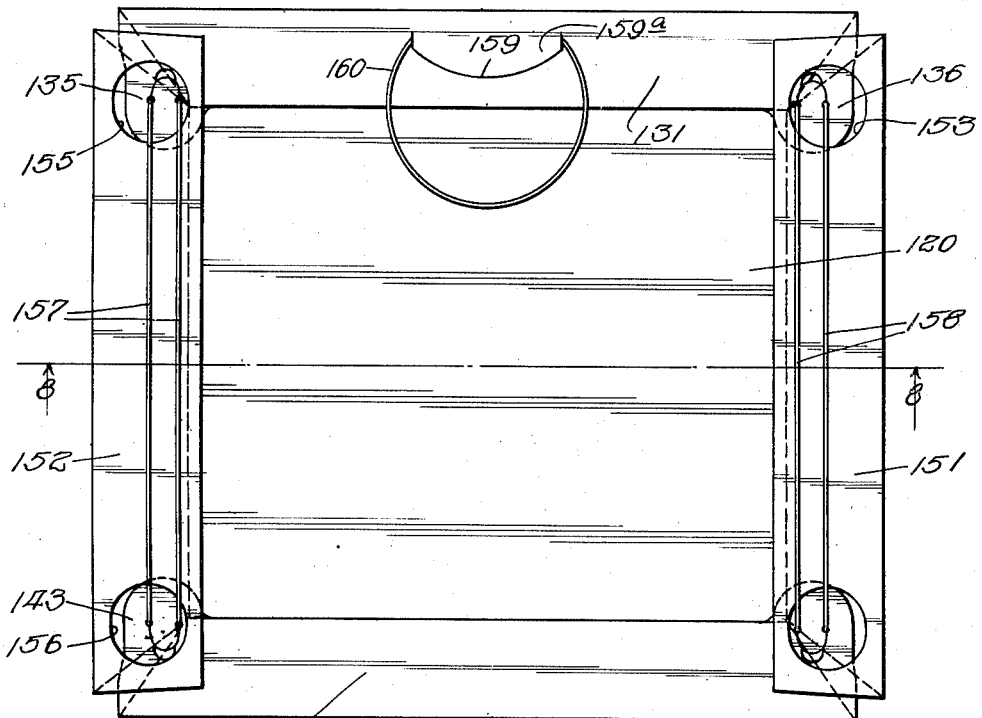
Fig. 6 is a rear elevational view of an alternative form of the device in collapsed position.

Referring to the drawings in greater detail, and referring to the device shown in Figs. 1 to 5, inclusive; as best seen in Fig. 3, a display device formed of paperboard or other sheet material has a display panel 20 which has straight margins defined by cut score lines 21, 22, 23 and 24 in the rear face of the device. The invention is here illustrated as applied to a device having a rectangular display panel 20, but the principals of the invention may likewise be applied to other polygonal shapes.

Hinged to the display panel 20 along the aforesaid cut score line are frame pieces 25, 26, 27 and 28, each of which extends along one margin of the display panel 20, the frame pieces having diagonal ends, as shown, so that the frame pieces may be moved into positions in which each is disposed at an angle to the plane of the display panel 20 with their diagonal ends in abutting relationship.

Hinged to the frame pieces 25 and 27 by means of cut score lines 29 and 30 are primary assembly strips 31 and 32, respectively. Adjacent the ends of the primary assembly strip 31 are diagonal crease score lines 33 and 34 so that the ends of each primary assembly strip consist of hinged tabs 35 and 36, respectively, which are disposed at an acute angle with respect to the outer margin of the assembly strip 31. The tabs 35 and 36 are provided, respectively, with arcuate slots 37 and 38 defining outwardly facing tabs 39 and 40, respectively, which are approximately centrally located in the tabs 35 and 36.

The ends of the primary assembly strip 32 are in the form of tabs identical with those on the primary assembly strip 31, there being cut score lines 41 and 42 providing hinges for tabs 43 and 44, respectively, said tabs being provided with arcuate slots 45 and 46 defining outwardly facing tabs 47 and 48, respectively.

Along the outer margins of the frame pieces 26 and 28 are cut score lines 49 and 50 which provide hinges for secondary assembly strips 51 and 52, respectively. The secondary assembly strips 51 and 52 have their ends cut on a diagonal which makes the same angle with respect to the longitudinal margins of said strips as the angle of the score lines 33, 34, 41 and 42 with respect to the longitudinal margins of said strips. Adjacent its two ends the secondary assembly strip 51 has oval apertures 53 and 54, and the secondary assembly strip 52 is provided with similarly positioned oval apertures 55 and 56.

The device is initially put into condition for use by swinging the primary assembly strips 31 and 32 rearwardly about the score lines 29 and 30, respectively, so that they lie against the rear surfaces of the frame pieces 25 and 27, respectively, and which positions the tabs 35, 36, 43, and 44 against the rear faces of the frame pieces 26 and 28. The secondary assembly strips 51 and 52 are then swung rearwardly about their hinge lines 49 and 50 so as to lie against the undersides of the frame pieces 26 and 28, respectively, in which positions the strips 51 and 52 overlie the tabs 35, 36, 43 and 44 forming the end portions of the primary assembly strips 31 and 32, and the apertures 53, 54, 55 and 56 expose the portions of said tabs which contain the outwardly facing tabs 39, 40, 47 and 48; the tab 39 being exposed by the opening 55, the tab 40 by the opening 53, the tab 47 by the opening 56 and the tab 48 by the opening 54. When this has been done the device is in the condition illustrated in Fig. 1. A rubber band 57 may be looped around the outwardly facing tabs 39 and 47, and a second rubber band 58 may be looped around the outwardly facing tabs 40 and 48, so that said rubber bands are tensioned between the two primary assembly strips 31 and 32 which are in positions opposite one another, and the end portions of the rubber bands 57 and 58 underlie the secondary assembly strips 51 and 52.

The device will remain in the position of Fig. 1 as long as it is compressed so as to overcome the tendency of the rubber bands 57 and 58 to draw the oppositely positioned primary assembly strips 31 and 32 toward one another. When the device is relieved of compressive force such as would be provided by a shipping box or envelope, the tension of the rubber bands 57 and 58 draws the primary assembly strips 31 and 32 toward one another which moves the frame pieces 25 and 27 to their assembled positions. The position of the tabs 35, 36, 43 and 44 between the frame pieces 26 and 28 and the secondary assembly strips 51 and 52 causes said frame pieces to assume their assembly positions and draws said assembly strips toward one another. The fact that portions of the rubber bands 57 and 58 underlie the secondary assembly strips causes said strips to retain their proper positions with respect to the tabs on the primary assembly strips and the frame pieces 26 and 28. In its assembled position, the device appears as shown in Fig. 2, with the diagonal ends of the frame pieces in abutting relationship so as to form the appearance of a continuous frame surrounding the display panel 20 and extending diagonally forward from the plane of said display panel.

The device may be provided with a suitable hanger such as a hinged member 59 having a hanging cord 60; or if desired an easel may be placed on the back of the display device in the usual fashion.

Figure 7:
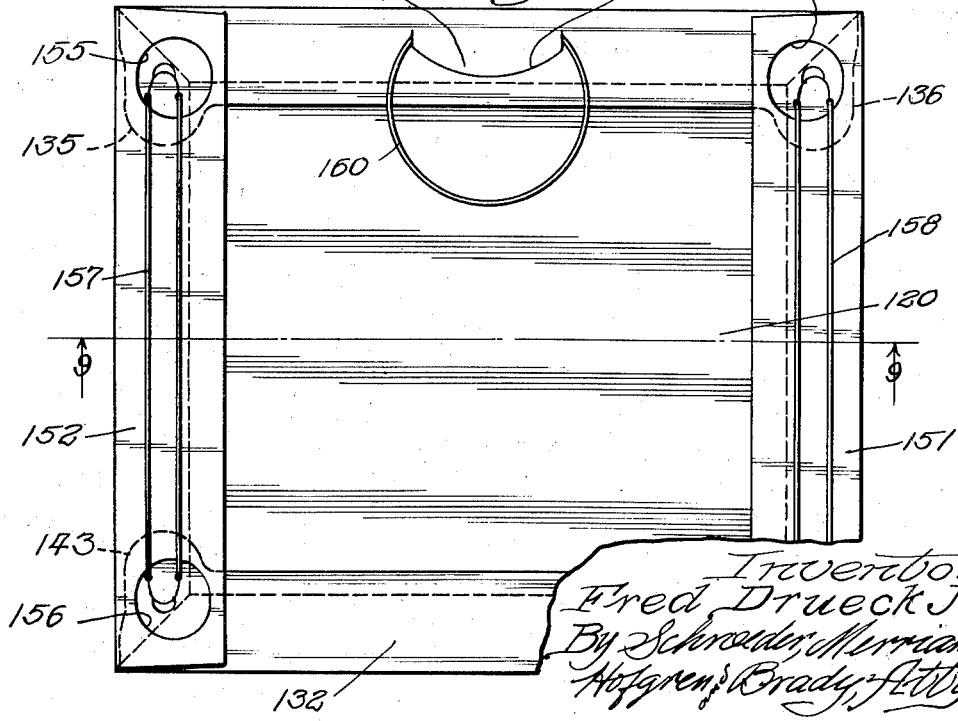
Fig. 7 is a similar view of the device of Fig. 6 in assembled position.

Turning now to the form of the device illustrated in Figs. 6 to 10, inclusive; as best seen in Fig. 10, the display device includes a display panel 120 which has straight margins defined by cut score lines 121, 122, 123 and 124 in the front face of the device. Hinged to the display panel 120 along the aforesaid cut score lines are frame pieces 125, 126, 127 and 128, which are similar to the frame pieces in the form of the device shown in Figs. 1 to 5.

Cut score lines 129 and 130 along the margins of the frame pieces 125 and 127 provide hinges for primary assembly strips 131 and 132, respectively. At the ends of the primary assembly strip 131, and projecting from the longitudinal edge thereof, are rigid, integral projecting tabs 135 and 136. In the end portions of the primary assembly strip 131, adjacent the tabs 135 and 136 are arcuate slots 137 and 138 which define outwardly facing tabs 139 and 140, respectively. The primary assembly strip 132 is similar to the strip 131, having projecting tabs 143 and 144, and adjacent said tabs are arcuate slots 145 and 146 defining outwardly facing tabs 147 and 148, respectively.

Along the outer margins of the frame pieces 126 and 128 are cut score lines 149 and 150 which provide hinges for secondary assembly strips 151 and 152, respectively, which are similar to the secondary assembly strips in the form of the device shown in Figs. 1 to 5. The secondary assembly strip 151 has apertures 153 and 154 adjacent its ends, and the secondary assembly strip 152 has similarly positioned apertures 155 and 156.

The device is initially put into condition for use by swinging the primary assembly strips 131 and 132 rearwardly about the cut score lines 129 and 130 so as to bring them into surface abutting relationship with the frame pieces 125 and 127, in which position the projecting tabs 135, 136, 143 and 144 overlie the ends of the frame pieces 126 and 128. The secondary assembly strips 151 and 152 are then swung rearwardly along the cut score lines 149 and 150 so that their end portions overlie the tabs 135, 136, 143 and 144, in which position the outwardly facing tabs 139, 140, 147 and 148 are exposed by the apertures 155, 153, 156 and 154, respectively. A rubber band 157 may then be looped around the outwardly facing tabs 139 and 147, and a second rubber band 158 looped around the outwardly facing tabs 140 and 148 so that said rubber bands are tensioned between the two primary assembly strips 131 and 132 which are in positions opposite one another, and end portions of the rubber bands 157 and 158 underlie the secondary assembly strips 151 and 152. The device is substantially identical with that shown in Figs. 1 to 5, except for the fact that the tension of the rubber bands 157 and 158 hinges the frame pieces 125, 126, 127 and 128 rearwardly with respect to the display panel 120 rather than forwardly as is the case in the first form of the device. Like the first form of the device it is held in collapsed position by the confining force of a shipping envelope or package, and automatically assumes its assembled position upon being relieved of the confining force.

A suitable hanger may be provided by a slot 159 defining a tab 159a to receive a hanging cord 160.

Turning now to the form of the device shown in Figs. 11 to 15, inclusive, and referring particularly to Fig. 15, a display panel 220 has marginal cut score lines 221, 222, 223 and 224 in its front face which provide hinges for the frame pieces 225, 226, 227 and 228, respectively. The frame pieces are identical with the frame pieces in the first two forms of the device.

Hinged to the frame pieces 225 and 227 by means of cut score lines 229 and 230 are primary assembly strips 231 and 232, respectively. The ends of the primary assembly strips 231 and 232 are nearly straight, but have small jogs 233 and 234 on the assembly strip 231, and 235 and 236 on the assembly strip 232. These jogs simplify the assembly of the device as will be pointed out in more detail hereafter. The primary assembly strip 231 is provided at its center with an arcuate slot 237 defining an outwardly facing tab 239, and the assembly strip 232 is provided at its center with an arcuate slot 245 defining an outwardly facing tab 247.

Along the outer margins of the frame pieces 226 and 228 are cut score lines 249 and 250 which provide hinges for the secondary assembly strips 251 and 252, respectively. The ends of the secondary assembly strips are cut on a slight diagonal. The secondary assembly strip 251 has a centrally positioned slot 253 defining an outwardly facing tab 254, and the secondary assembly strip 252 has a centrally positioned slot 255 defining an outwardly facing tab 256.

The device is initially put into condition for use by swinging the primary assembly strips 231 and 232 rearwardly about their hinges 229 and 230, respectively, so that their end portions lie beneath the ends of the frame pieces 226 and 228, and the secondary assembly strips 251 and 252 are then swung rearwardly about the hinges 249 and 250 so that their ends overlie the ends of the primary assembly strips 231 and 232. A single rubber band 257 may then be looped around the outwardly facing tabs 239 and 247 on the primary assembly strips 231 and 232, and may have its side portions drawn outwardly and looped around the tabs 254 and 256 on the secondary assembly strips 251 and 252 so that portions of said rubber band underlie said secondary assembly strips.

The tension of the rubber band 257 on the primary assembly strips draw said strips together and automatically moves the frame pieces 225 and 227 into their assembled positions projecting rearwardly from the display panel 220, and the engagement of the ends of the primary assembly strips with the ends of the secondary assembly strips causes said secondary assembly strips and their associated frame pieces 226 and 228 to also be moved to their assembled positions. The jogs in the ends of the primary assembly strips 231 and 232 prevent undesirable interference between the outer portions of the ends of said strips and the junction between the frame pieces 226 and 228 and the secondary assembly strips 251 and 252 which might otherwise prevent the ends of the four frame pieces from coming into abutting relationship.

The engagement of the rubber band 257 with the outwardly facing tabs 254 and 256 on the secondary assembly strips assists in drawing the unit to its assembled position, but a more important function of the rubber band with respect to the secondary assembly strips is the fact that the portions of the rubber band 257 which overlie the secondary assembly strips hold said strips down and firmly link them directly to the primary assembly strips.

It will be noted that the overlying portions of the rubber bands in the first two forms of the device function in the same manner—that is, the secondary assembly strips are caused to move to their assembled positions by the movement of the overlying tabs on the primary assembly strips and the fact that parts of the rubber bands underlie the secondary assembly strips serves mainly to link said assembly strips to the primary assembly strips and keep them from swinging free of the tabs.

As with the other forms of the device the form shown in Figs. 11 to 15 may be provided with a hanger member which in this case is afforded by slots 259 to receive a hanging cord 260.

The foregoing detailed description is given for clearness of understanding only and no unnecessary limitations are to be understood therefrom, as some modifications will be obvious to those skilled in the art.

I claim:

1. A collapsible display device provided with an integral frame comprising: a display portion having straight margins; a frame piece hinged to each margin of said display portion for movement between assembled positions in which they are angularly disposed with respect to the plane of the display portion and collapsed positions substantially in said plane; a primary assembly strip hinged on each alternate frame piece and lying there-behind; secondary assembly strips hinged on the intervening frame pieces between said primary assembly strips and having their end portions overlapping those of the primary assembly strips; and by elastic means secured to the ends of said primary assembly strips and tensioned between opposite primary assembly strips, to draw said strips toward one another, so that movement of the primary assembly strips toward one another moves the secondary assembly strips toward one another and the frame pieces to their assembled angularly disposed positions, said elastic means being unsecured to said secondary strips and having portions underlying said secondary assembly strips.

2. The display device of claim 1 in which the primary assembly strips are provided with arcuate slots defining outwardly facing tabs at each end, and the elastic means are looped around said tabs.

3. The display device of claim 1 in which the frame pieces extend rearwardly of the display portion in assembled position, and the assembly strips lie in planes parallel to that of the display portion in said position.

4. The display device of claim 1 in which the frame pieces extend rearwardly of the display portion in assembled position, the assembly strips lie in planes parallel to that of the display portion in said position, and single elastic means is tensioned between opposite primary assembly strips and also between opposite secondary assembly strips and underlies portions of said secondary assembly strips.

5. The display device of claim 4 in which each assembly strip is provided substantially at its center with an arcuate slot defining an outwardly facing tab, and the elastic means is looped around all of said tabs.

6. The display device of claim 1 in which the frame pieces extend forwardly of the display portion in assembled position, and the assembly strips are in continuous surface abutting relationship to said frame pieces in said position.

7. The display device of claim 6 in which the end portions of the primary assembly strips comprise hinged tabs which are sandwiched between the end portions of an adjacent frame piece and of a secondary assembly strip.

8. The display device of claim 1 in which the secondary assembly strips have apertures at their ends to expose parts of the ends of the primary assembly strips, and the elastic means is secured to the exposed parts of the primary assembly strips.

9. A collapsible display device provided with an integral frame, comprising: a display portion having straight margins; a frame piece hinged to each margin of said display portion for movement between assembled positions in which they are angularly disposed with respect to the plane of the display portion and collapsed positions substantially in said plane, said frame pieces being adapted to extend rearwardly of the display portion in assembled position; a primary assembly strip hinged on each alternate frame piece and lying there-behind; secondary assembly strips hinged on the frame pieces between said primary assembly strips having their end portions underlying those of the primary assembly strips so that movement of the primary assembly strips toward one another moves the secondary assembly strips toward one another and moves the frame pieces to their assembled positions, said assembly strips being adapted to lie in planes parallel to that of said display portion in the assembled positions; said secondary assembly strips having apertures at their ends to expose parts of the ends of the primary assembly strips; and elastic means tensioned between opposite primary assembly strips to draw said strips toward one another, said elastic means by freeing of attachment to said secondary assembly strips but having portions underlying said secondary assembly strips and being secured only to exposed parts of the primary assembly strips.

References Cited in the file of this patent

UNITED STATES PATENTS

| | | |
|---|---|---|
| 777,079 | Cottle | Dec. 13, 1904 |
| 899,393 | Fratcher | Sept. 22, 1908 |
| 2,144,594 | Katz | Jan. 17, 1939 |
| 2,312,644 | Horr | Mar. 2, 1943 |
| 2,332,642 | Johnson | Oct. 26, 1943 |
| 2,373,074 | Ziemmerman | Apr. 3, 1945 |
| 2,562,590 | Viglietta | July 31, 1951 |

FOREIGN PATENTS

| | | |
|---|---|---|
| 19,195 | Great Britain | June 30, 1910 |

OTHER REFERENCES

Art Supplement, "Can't You Talk," Boston Globe for Sunday, April 2, 1905, classified in class 40, subclass 155.